United States Patent [19]

Shinnai et al.

[11] Patent Number: 4,967,202

[45] Date of Patent: Oct. 30, 1990

[54] VEHICLE WINDOW GLASS ANTENNA SUITED TO RECEPTION OF FM RADIO AND TV BROADCASTING

[75] Inventors: Masao Shinnai; Kazuya Nishikawa; Tokio Tsukada; Tohru Hirotsu, all of Matsusaka, Japan

[73] Assignee: Central Glass Company, Limited, Ube, Japan

[21] Appl. No.: 315,267

[22] Filed: Feb. 24, 1989

[30] Foreign Application Priority Data

Feb. 25, 1988 [JP] Japan ................................... 63-40723
Apr. 28, 1988 [JP] Japan ................................. 63-107787

[51] Int. Cl.$^5$ ............................................ H01Q 1/320
[52] U.S. Cl. ...................................... 343/713; 343/711
[58] Field of Search ................................. 343/711, 713

[56] References Cited

U.S. PATENT DOCUMENTS

| | | | |
|---|---|---|---|
| 4,602,260 | 7/1986 | Lindenmeier et al. | 343/713 |
| 4,608,570 | 8/1986 | Inaba et al. | 343/713 |
| 4,727,377 | 2/1988 | Yotsuya et al. | 343/711 |
| 4,749,998 | 6/1988 | Yotsuya | 343/713 |
| 4,768,037 | 8/1988 | Inaba et al. | 343/713 |
| 4,791,425 | 12/1988 | Yosuya et al. | 343/713 |

FOREIGN PATENT DOCUMENTS

| | | |
|---|---|---|
| 50-91443 | 8/1975 | Japan . |
| 55-150602 | 11/1980 | Japan . |
| 61-280107 | 12/1986 | Japan . |
| 2106718 | 4/1983 | United Kingdom ................. 343/713 |

*Primary Examiner*—Rolf Hille
*Assistant Examiner*—Peter Toby Brown
*Attorney, Agent, or Firm*—Fleit, Jacobson, Cohn, Price, Holman & Stern

[57] ABSTRACT

The invention relates to a wide-band antenna attached to a vehicle window glass such as an automobile windshield for receiving FM radio and TV broadcast waves. Each element of the antenna is a conductive strip. The antenna is comprised of a main element and an impedance matching element to make a resistance component of the impedance of the antenna equal to or greater than that of coaxial cable used as the feeder for the antenna. The main element has a vertical part in a widthwise central region of the window glass with its one end at a short distance from either the lower edge or the upper edge of the glass and a horizontal part which extends from that end of the vertical part to a side marginal region of the glass. A feed point of the antenna is in a lower end portion of the side marginal region of the glass. When the horizontal part is close to the lower edge it terminates at the feed point, and the impedance matching element is connected to the horizontal part. When the horizontal part is close to the upper edge a supplementary part of the main element extends in the side marginal region from the end of the horizontal part to the feed point, and the impedance matching element is connected to the supplementary part.

6 Claims, 4 Drawing Sheets

VEHICLE WINDOW GLASS ANTENNA SUITED TO RECEPTION OF FM RADIO AND TV BROADCASTING

BACKGROUND OF THE INVENTION

This invention relates to a vehicle window glass antenna for receiving broadcast waves, which is made up of conductive strips attached to the window glass in a suitable pattern. The antenna is particularly suited to automobiles.

In recent automobiles there is a trend to adoption of a so-called window glass antenna for receiving broadcast waves. In most cases the window glass antenna is provided in the rear window glass and is constructed of conductive strips disposed on the glass surface in a suitable pattern. The antenna is located in a relatively narrow space left above an array of defogging heater strips. Usually the conductive strips used as the antenna elements are electrically independent of the heater strips.

With an automobile window glass antenna of the above described type, it is difficult to receive FM radio broadcast waves and television (TV) broadcast waves with sufficiently high gains mainly because of the narrowness of the space which the antenna is allowed to occupy. As a countermeasure it is known to make an electrical connection between the antenna strips and the heater strips to utilize the heater strips as auxiliary antenna elements, and vice versa. However, this measure has a disadvantage that during defogging operation intrusion of considerable noise into the received signal is inevitable.

Also it has been developed to provide the windshield of an automobile with an antenna using either conductive strips or a transparent and conductive film. In this case it is possible to receive radio broadcast waves with relatively high gains since the antenna is allowed to occupy a relatively broad area.

Recently there is an increasing demand for an automobile window glass antenna which can efficiently receive both FM radio broadcast waves and TV broadcast waves, but thus far such a demand has not been met. That is, on an automobile window glas, even in the case of the windshield, it is very difficult to provide an antenna which exhibits high gains over a very wide range of frequency including both the VHF band (90–222 MHz) and the UHF band (470–770 MHz) used for TV braodcasting.

SUMMARY OF THE INVENTION

It is an object of the present invention to provide a vehicle window glass antenna which is suited to automobiles and functions as a wide-band antenna capable of receiving FM radio broadcase waves and TV broadcast waves, of both the VHF band and the UHF band, with sufficiently high gains.

The present invention provides an antenna attached to a vehicle window glass for receiving broadcast waves, the antenna comprising a feed point disposed in a lower end part of a side marginal region of the window glass, a main antenna element which is a conductive strip and comprises a first part, which extends substantially perpendicular to the upper and lower edges of the window glass in a widthwise central region of the window glass and has an end at a short distance from one of the upper and lower edges of the window glass, and a second part which extends from said end of the first part to the feed point along and at a short distance from an edge or two adjacent edges of the window glass, and an impedance matchiong antenna element which is a conductive strip connected directly to the second part of the main antenna element.

In an antenna according to the invention the main antenna element is a L-shaped element when its second part extends from the lower end of the first part. That is, in this case the second part of the main antenna element is a horizontal part which extends substantially parallel to and at a short distance from the lower edge of the window glass.

When the second part of the main antenna element extends from the upper end of the first part, the main antenna element is comprised of two adjacent parts arranged in the shape of inverted L and a supplementary part which extends downward from the extended end of the horizontal part of the inverted L to the feed point. That is, in this case the second part of the main antenna element consists of a horizontal part which extends substantially parallel to and at a short distance from the upper edge of the window glass and the aforementioned downwardly extending supplementary part. In this case it is preferred to connect the impedance matching antenna element directly to the supplementary part of the main antenna element.

In many cases it suffices to employ a straight and relatively short segment of conductive strip as the impedance matching antenna element in the present invention, though this element can have various shapes as will be illustrated hereinafter. In this invention, it is permissible to make direct connection of the impedance matching antenna element to the second part of the main antenna element in the manner of insertion of the impedance matching element in the second part of the main element. The "insertion" means making a gap in the second part of the main antenna element to thereby divide the second part into two segments, connecting one end of the impedance matching element to the end of one segment which extends from the first part of the main element and connecting the other end of the impedance matching element to the end of the other segment which extends to the feed point.

The present invention is very suitable for application to the windshield of an automobile. A vehicle window glass antenna according to the invention is relatively simple in the pattern of the conductive strips used as antenna elements, and this antenna serves as a wide-band antenna which exhibits sufficiently high gains in receiving FM radio broadcast waves, of both the 76–90 MHz band used in Japan and the 88–108 MHz band used in many other countries, and TV broadcast waves of both the VHF band and the UHF band.

In an antenna according to the invention, the high gains in receiving either FM radio broadcasting or TV broadcasting are primarily by virtue of the above stated shape and arrangement of the main antenna element.

The impedance matching antenna element serves the function of adjusting the impedance of the antenna close to the impedance of the feeder connected to the wire to thereby reduce a drop in the reception gain attributed to mismatching loss and to consequently realize very wide-band reception of broadcast waves.

When the impedance $Z_a$ of an antenna and the impedance $Z_f$ of the feeder connected to the antenna are mismatched, the amount of mismatching loss M is given by the following equation:

$$M = 1/(1 - |\Gamma|^2)$$

where $\Gamma = (Z_a - Z_f)/(Z_a + Z_f)$.

Usually a coaxial cable is used as the feeder, and the resistance component, $R_f$, of the impedance $Z_f$ of the coaxial cable is 75Ω. Assuming that the reactance component of $Z_f$ is zero, i.e., $Z_f = R_f = 75\Omega$, and that the impedance $Z_a$ of the antenna includes a reactance component $X_a$ besides a resistance component $R_a$, i.e., $Z_a = R_a + jX_a$, of course it is desirable that the reactance component $X_a$ of the antenna be very close to 0Ω. Though the amount of mismatching loss M increases as the absolute value of $X_a$ increases, the amount of the loss M is in a tolerable range insofar as the deviation of $X_a$ from 0Ω is less than about ±150Ω. As to the resistance component $R_a$ it is desirable that $R_a$ be equal to or close to 75Ω. Actually, however, some difference of $R_a$ from 75Ω is inevitable. When the value of $R_a$ is smaller than 75Ω the difference, $(75 - R_a)\Omega$, brings about a great increase in mismatching loss M even though the difference is relatively small. When the value of $R_a$ is larger than 75Ω the amount of increase in mismatching loss M attributed to the difference, $(R_a - 75)\Omega$, is relatively small. In the present invention the impedance matching antenna element is arranged so as to render the resistance component $R_a$ of the antenna impedance close to and greater than 75Ω to thereby decrease the amount of mismatching loss M.

If desired, it is possible to use a window glass antenna according to the invention in combination with either another window glass antenna or a conventional pole antenna so as to make diversity reception.

BRIED DESCRIPTION OF THE DRAWINGS

DESCRIPTION OF THE PREFERRED EMBODIMENTS

Figure 1:
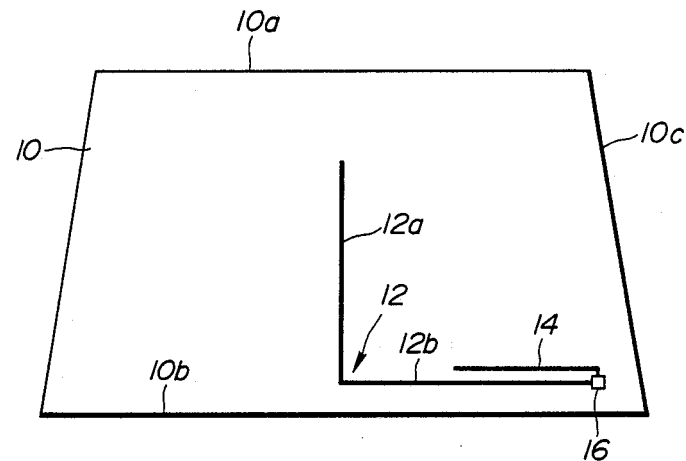
FIG. 1 is a plan view of an automobile windshield glass provided with an antenna as an embodiment of the invention.

FIG. 1 shows an embodiment of the present invention in an automobile windshield glass 10. As is usual, the windshield glass 10 is a panel of laminated glass with a transparent resin film such as a polyvinyl butyral film sandwiched between two sheets of glass. An antenna of the following construction is disposed on the inboard surface of the windshield glass 10.

The antenna of FIG. 1 has two elements, viz., a main antenna element 12 and an impedance matching antenna element 14, each of which is a conductive strip formed by printing a conductive paste onto the glass surface and, after drying, baking the glass panel 10 with the printed paste thereon. The main element 12 of the antenna is a L-shaped element having a vertical part 12a and a horizontal part 12b. The vertical part 12a extends approximately on the vertical center axis of the glass plate 10, but does not reach the upper edge 10a of the glass panel 10. The horizontal part extends from the lower end of the vertical part 12a, which is at a short distance from the lower edge 10b of the glass panel, toward the righthand edge 10c of the glass panel to terminate at and connect to a feed point 16 located at short distances from the glass edges 10b and 10c. The feed point 16 too is provided on the glass surface by the aforementioned print-and-bake method. The impedance matching antenna element 14 extends above and parallel to the horizontal part 12b of the main element 12. An end portion of this element 14 is at a short distance from the righthand edge 10c of the glass panel 10 and turns downward to connect to the feed point 16 and, hence, to the horizontal part 12b of the main antenna element 12. This element 14 is shorter than the horizontal part 12b of the L-shaped element 12 and, therefore, does not intersect the vertical part 12a of the L-shaped element 12.

In the L-shaped main antenna element 12 the vertical part 12a is more important than the horizontal part 12b. Therefore the vertical part 12a needs to have a length not shorter than 500 mm. The length of the vertical part 12a is not necessarily a resonant length with respect to the wavelength of a broadcast wave to be received, and according to the size of the glass panel 10 the length can suitably be chosen within the range from 500 mm to about 1000 mm. If desired, the main antenna element 12 may have a supplementary part such as, for example, a short strip that extends horizontally from a point on an upper end portion of the vertical part 12a.

As described hereinbefore, the impedance matching antenna element 14 is designed such that the resistance component $R_a$ of the impedance of the whole antenna becomes equal to or slightly greater than the resistance component $R_f$ of the impedance of the feeder wire (not shown) to which the antenna is connected. When the feeder wire is a usual coaxial cable, $R_a$ is regulated to 75Ω or a slightly larger value.

In the present invention the feed point 16 is always located in a lower end part of a side marginal region of the window glass. This is primarily for conformance with the shape and arrangement of the main antenna element and, besides, this is convenient for wiring of feeder for the antenna and is favorable for the appearance of the window glass.

In a sample of the windshield glass of FIG. 1, the glass panels 10 was 1200 mm in the length of the upper edge 10a, 1480 mm in the length of the lower edge 10b and 740 mm in the vertical length. In the L-shaped antenna element 12 the vertical part 12a was 590 mm long and the horizontal part 12b was 670 mm long. The horizontal part 12b was at a vertical distance of 50 mm from the lower edge 10b of the glass panel. The impedance matching antenna element 14 was 400 mm in horizontal length and at a vertical distance of 10 mm from the horizontal part 12a of the element 12.

Gains of this sample antenna in receiving FM radio broadcast waves and TV broadcast waves were measured and compared with gains of a standard dipole antenna. That is, for any frequency the gain of the dipole antenna was taken as the basis, 0 dB, and the gain of the sample antenna was marked on this basis. As the result, gain of the sample antenna was −16.2 dB on an average in the Japanese domestic FM radio broadcasting band of 76-90 MHz, −15.6 dB on an average in the foreign FM broadcasting band of 88-108 MHz, −15.3 dB on an average in the VHF TV broadcasting band of 90-222 MHz and −17.1 dB on an average in the UHF TV broadcasting band of 470-770 MHz. For comparison, by the same testing a good example of conventional window glass antennas in practical use on automobile windshields exhibited an average gain (vs. dipole antenna) of about −18 dB in any of the aforementioned four bands. Therefore, the antenna of FIG. 1 is judged to be a good wide-band antenna.

To confirm the degree of contribution of the horizontal part 12b of the main element 12 to the efficiency of the antenna of FIG. 1, the above sample antenna was modified by omitting the horizontal part 12b of the element 12. In this case average gains (vs. dipole antenna) in the respective bands were as shown in Table 1. The results indicate that, although the vertical part 12a alone serves as a fairly good antenna, the addition of the horizontal part 12b has the effect of increasing the receiving gain in any of the four bands.

TABLE 1

|  | FM Radio | | TV | |
| --- | --- | --- | --- | --- |
|  | 76-90 MHz | 88-108 MHz | VHF | UHF |
| L-shaped element 12 | −18.0 dB | −16.2 dB | −17.1 dB | −18.2 dB |
| without horizontal part 12b | −19.3 dB | −18.9 dB | −18.1 dB | −19.8 dB |

Besides, to examine the effects of the impedance matching antenna element 14 the sample antenna was modified by omitting the antenna element 14, and average gains vs. dipole antenna of the modified and unmodified sample antennas were measured for each of the seven channels in the VHF TV broadcasting band. Impedance values of each sample antenna were also measured. The results are shown in Table 2. The results indicate that by inclusion of the impedance matching antenna element 14 the resistance component $R_a$ of the antenna shifts toward the + (plus) side while the reactance component $X_a$ is maintained within $\pm 150\Omega$, and that the gains of the antenna further increases by the incorporation of the impedance matching antenna element 14.

the shape and location of the impedance matching antenna element 14. In this case the impedance matching antenna element 14 is in the shape of an almost complete rectangle which is horizontally elongate. The horizontal part 12b of the main antenna element 12 is divided into two neary equal segments $12b_1$ and $12b_2$, and in the electrical sense the impedance matching element 14 is interposed between the two segments $12b_1$ and $12b_2$. By testing in the above described manner the antenna of FIG. 3 proved to be nearly equivalent to the antenna of FIG. 1 when used to receive FM radio broadcast waves and TV broadcast waves of either VHF band or UHF band.

Figure 4:
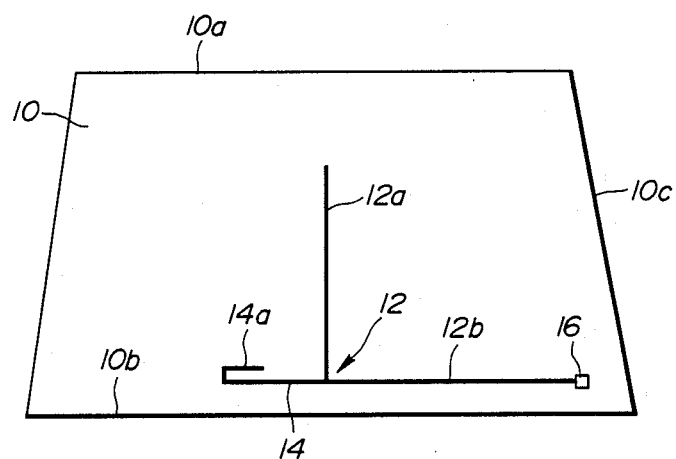

As a fourth embodiment of the invention FIG. 4 shows another modification of the impedance matching antenna element 14 in the antenna of FIG. 1. In this case the element 14 extends toward the lefthand edge of the glass panel 10 as if an extension of the horizontal part 12b of the main antenna element 12, and the element 14 has a short turn-back part 14a as an end portion remote from the main element 12. In a sample of this antenna the horizontal length of the impedance matching element 14 was 250 mm excluding the turn-back part 14a. The sample of the antenna of FIG. 4 proved to be nearly equivalent to the sample of the antenna of FIG. 1 in gains in receiving FM radio broadcast waves and TV broadcast waves.

Figure 5:
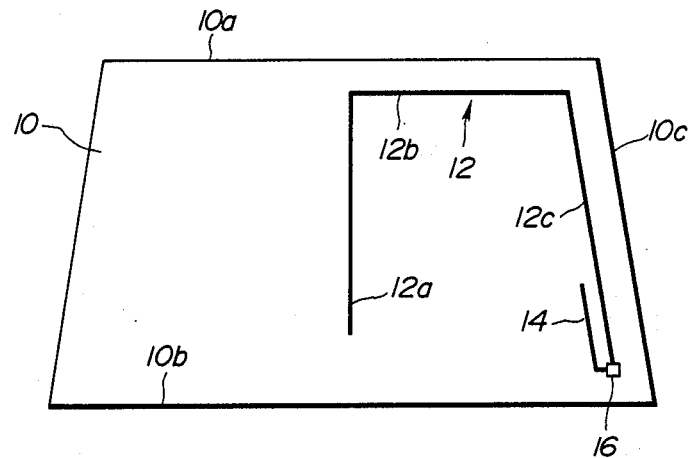
FIG. 5 is a plan view of an automobile windshield glass provided with an antenna as a still different embodiment of the invention.

FIG. 5 shows a fifth embodiment of the invention on the same windshield glass 10. In this antenna too the main element 12 has a vertical part 12a, which extends approximately on the vertical center axis of the glass panel 10 but does not reach the upper and lower edges 10a and 10b of the glass panel. The upper end of the vertical part 12a is at a short distance from the upper edge 10a of the glass panel. Further, the main element 12 has a horizontal part 12b, which extends from the upper end of the vertical part 12a to a point at a short distance from the righthand side edge 10c of the glass panel, and a supplementary part 12c which extends from

TABLE 2

| Ch. | VHF Frequency (MHz) | Without Impedance Matching Antenna | | | With Impedance Matching Antenna | | |
| --- | --- | --- | --- | --- | --- | --- | --- |
| | | $R_a$ ($\Omega$) | $X_a$ ($\Omega$) | gain (dB) | $R_a$ ($\Omega$) | $X_a$ ($\Omega$) | gain (dB) |
| 1 | 93 | 63.5 | −98.5 | −13.8 | 85.4 | −43.0 | −14.1 |
| 3 | 105 | 72.5 | −82.6 | −14.3 | 115.2 | −25.6 | −14.0 |
| 4 | 173 | 170.4 | −129.1 | −15.4 | 101.7 | −148.3 | −15.1 |
| 6 | 185 | 28.7 | −68.9 | −17.6 | 90.4 | −141.5 | −15.3 |
| 8 | 195 | 25.2 | −62.2 | −19.4 | 62.5 | −119.7 | −15.8 |
| 10 | 207 | 21.7 | −58.9 | −21.6 | 43.3 | −98.4 | −17.0 |
| 12 | 219 | 30.1 | −36.6 | −17.7 | 38.5 | −85.8 | −15.7 |
| average | | — | — | −17.1 | — | — | −15.3 |

Figure 2:
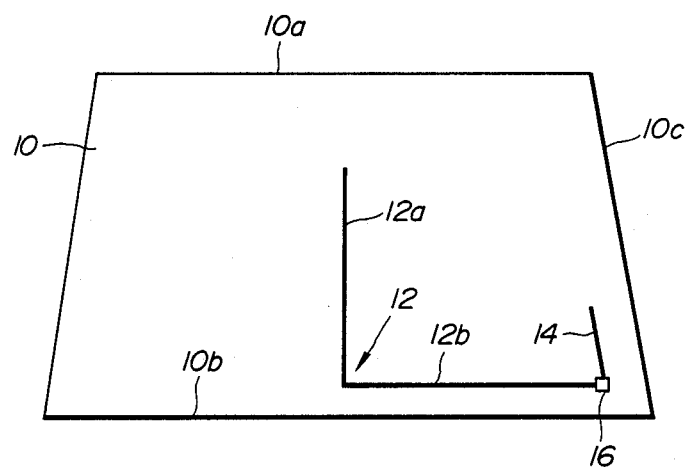
FIGS. 2 to 4 show three different modifications of the antenna of FIG. 1, respectively.

FIG. 2 shows a second embodiment of the invention on the same windshield glass. The antenna of FIG. 2 is a modification of the antenna of FIG. 1 only in that the impedance matching antenna element 14 entirely extends parallel to the righthand edge 10c of the glass panel 10. In a sample of this antenna the impedance matching antenna element 14 was 300 mm long. In other respects the sample had the same dimensions as the sample of the antenna of FIG. 1. In receiving FM radio broadcast waves and TV broadcast waves the sample of the antenna of FIG. 2 proved to be nearly equivalent in gains to the antenna of FIG. 1, though gains in the VHF TV band decreased by about 0.6 dB.

Figure 3:
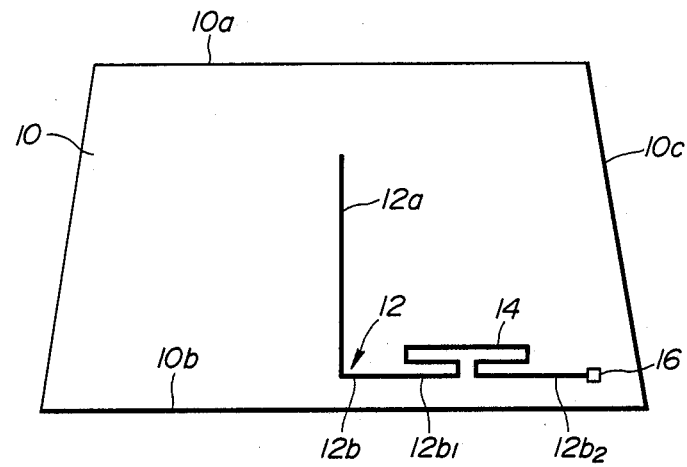

As a third embodiment of the invention, FIG. 3 shows another modification of the antenna of FIG. 1 in the righthand end of the horizontal part 12b down-ward and approximately parallel to the righthand side edge 10c of the glass panel and connects to the feed point 16 located at short distances from the glass edges 10b and 10c. That is, the main element 12 consists of an inverted L-shaped portion (12a+12b) and a supplementary portion (12c) which extends downward from the end of the horizontal part of the inverted L-shaped portion at an angle slightly greater than 90°.

Also in this embodiment the feed point 16 is located close to both the righthand edge 10c and the lower edge 10b of the glass panel 10, so that the main antenna element 12 has the downwardly extending part 12c in addition to the inverted L-shaped portion 12a, 12b. However, the supplementary part 12c is not merely connecting the inverted L-shaped portion 12a, 12b to the feed point 16. By the addition of this part 12c to the consequently further increasing the receiving gains of the antenna.

TABLE 3

| Ch. | VHF Frequency (MHz) | Without Impedance Matching Antenna | | | With Impedance Matching Antenna | | |
|---|---|---|---|---|---|---|---|
| | | $R_a$ ($\Omega$) | $X_a$ ($\Omega$) | gain (dB) | $R_a$ ($\Omega$) | $X_a$ ($\Omega$) | gain (dB) |
| 1 | 93 | 82.4 | −99.3 | −15.9 | 97.4 | −89.7 | −15.8 |
| 3 | 105 | 109.2 | −102.1 | −17.2 | 111.2 | −99.8 | −15.4 |
| 4 | 173 | 19.1 | +63.8 | −24.3 | 34.5 | +51.6 | −19.3 |
| 6 | 185 | 38.7 | +24.9 | −20.1 | 50.6 | +13.4 | −15.4 |
| 8 | 195 | 88.6 | −13.1 | −15.2 | 89.8 | −28.7 | −14.9 |
| 10 | 207 | 154.1 | −38.3 | −16.8 | 137.5 | −50.3 | −15.8 |
| 12 | 219 | 180.5 | −79.9 | −19.8 | 151.7 | −89.8 | −16.7 |
| average | | — | — | −18.5 | — | — | −16.2 | inverted L-shaped antenna element, average gain of the antenna in receiving FM radio or TV broadcast waves increases by about 1 dB.

In this antenna the impedance matching antenna element 14 extends parallel to a lower end portion of the supplementary part 12c of the main element 12 and, at its lower end, is connected to the feed point 16.

In a sample of the windshield glass of FIG. 5 the glass panel 10 had the same dimensions as in the sample of the windshield glass of FIG. 1. In the main antenna element 12 the vertical part 12a was 580 mm long. The horizontal part 12b was 545 mm long and at a vertical distance of 50 mm from the upper edge 10a of the glass panel. The supplementary part 12c was 660 mm long and at a horizontal distance of 60 mm from the glass edge 12c. The impedance matching element 14 was 220 mm long excluding the short horizontal part for connection to the feed point 16. The feed point 16 was at a vertical distance of 80 mm from the lower edge 10b of the glass panel.

Gains of this sample antenna in receiving FM radio broadcast waves and TV broadcast waves were measured and compared with gains of the standard dipole antenna, taking the gain of the dipole antenna for any frequency as the basis, 0 dB. As the result, gain of the sample antenna was −15.1 dB on an average in the FM broadcasting band of 76–90 MHz, −15.7 dB on an average in the FM broadcasting band of 88–108 MHz, −16.2 dB on an average in the VHF TV broadcasting band and −17.4 dB on an average in the UHF TV broadcasting band. Considering that the aforementioned good example of conventional windshield glass antennas exhibited an average gain (vs. dipole antenna) of about −18 dB in any of the four bands, the antenna of FIG. 5 is judged to be a good and practicable antenna for receiving FM radio and TV broadcast waves.

Figure 6:
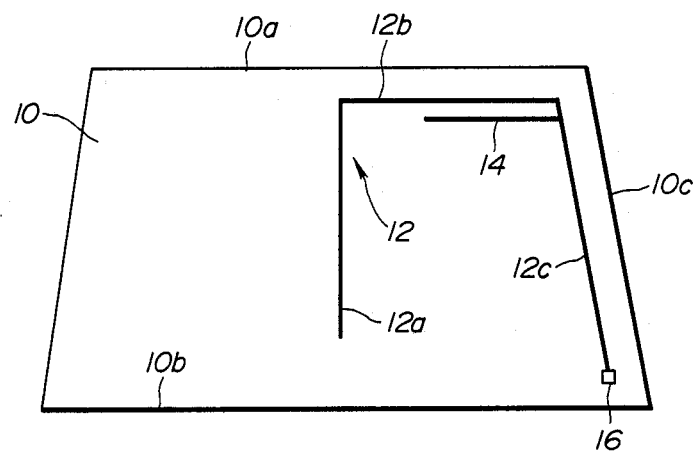
FIGS. 6 to 8 show three different modifications of the antenna of FIG. 5.

To examine the efficiency of the main antenna element 12 by itself and the effects of the impedance matching antenna element 14, the sample antenna was modified by omitting the antenna element 14, and average gains (vs. dipole antenna) of the modified and unmodified sample antennas were measured for each of the seven channels in the VHF TV broadcasting band. Impedance values of each sampel antenna were also measured. The results are shown in Table 3. The results indicate that the element 12 made up of the three segments 12a, 12b, 12c alone serves as an antenna capable of receiving TV broadcast waves with fairly high gains, and that the impedance matching antenna element 14 serves the function of shifting the resistance component $R_a$ of the antenna toward the + (plus) side while maintaining the reactance component $X_a$ within $\pm 100\Omega$ and FIG. 6 shows a modification of the antenna of FIG. 5 in the arrangement of the impedance matching element 14. In this embodiment the element 14 extends below and parallel to the horizontal part 12b of the main antenna element 12. The element 14 connects to the supplementary part 12c of the main element but does not intersect the vertical part 12a of the main element. In a sample of this antenna the impedance matching element 14 had a length of 320 mm. In other respects the sample had the same dimensions as the sample of the antenna of FIG. 5. In receiving FM radio broadcast waves and TV broadcast waves the sample of the antenna of FIG. 6 proved to be neary equivalent to the antenna of FIG. 5.

Figure 7:
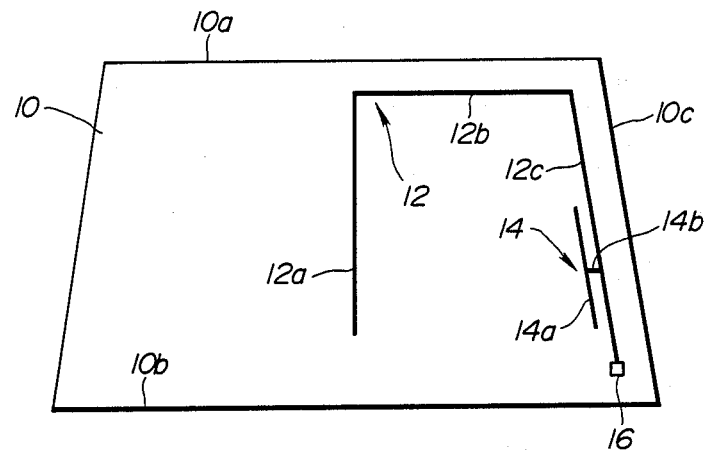

FIG. 7 shows another modification of the antenna of FIG. 5 in the arrangement of the impedance matching element 14. In this embodiment the element 14 is in the shaped of short-legged T. At the end of its short leg part 14b the T-shaped element 14 connects to the supplementary part 12c of the main antenna element 12 such that the relatively long "horizontal" part 14a of the T-shaped element 14 becomes parallel to the downwardly extending part 12c. In a sample of this antenna the main part 14a of the impedance matching element 14 was 300 mm long. In other respects the sample was identical with the sample of the antenna of FIG. 5 and proved to be nearly equivalent to the sample of the antenna of FIG. 5 in gains in receiving FM radio broadcast waves and TV broadcast waves.

Figure 8:
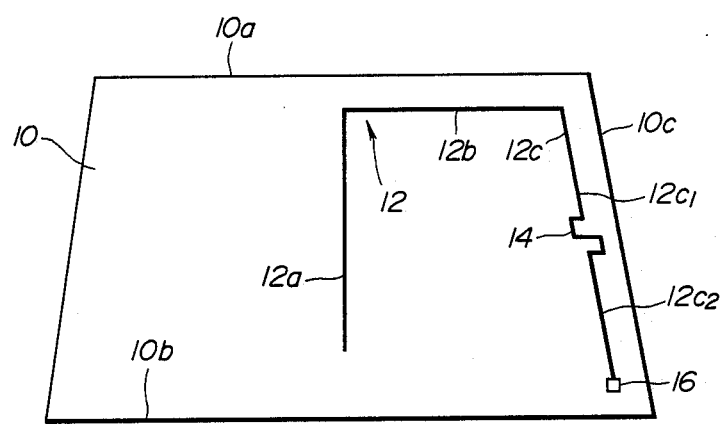

FIG. 8 shows a still different modification of the antenna of FIG. 5 in the shape and location of the impedance matching antenna element 14. In this embodiment the element 14 has a zigzag shape. The supplementary part 12c of the main antenna element 12 is divided into two nearly equal segments 12c₁ and 12c₂, and the impedance matching element 14 is interposed between the two segments 12c₁ and 12c₂ such that the segment 12c₁, element 14 and segment 12c₂ are electrically connected in series. The antenna of FIG. 8 proved to be nearly equivalent to the antenna of FIG. 5 in gains in receiving FM radio broadcast waves and TV broadcast waves.

As illustrated in FIGS. 5–8, when the main antenna element 12 includes the supplementary part 12c which extends along a side edge of the window glass it is preferred that the impedance matching antenna element 14 is connected to or inserted in that part 12c, not to or in the horizontal part 12b of the antenna element 12.

The antenna elements 12 and 14 are not necessarily formed by a printing and baking method using a conductive paste. Alternatively, the antenna elements can be formed by embedding a desired pattern of a thin metal wire such as copper wire in a transparent resin film which is interposed between the two sheets of glass in producing a panel of laminated glass. In the case of embodying the invention in an automobile rear window glass using laminated glass, the antenna may be provided by embedding a thin metal wire in the laminated glass to thereby allow providing defogging heater strips on the inboard surface of the window glass by using a conductive paste.

What is claimed is:

1. An antenna attached to an automobile windshield glass for receiving broadcast waves, the antenna comprising:
    a feed point disposed in a lower end part of a side marginal region of the window glass;
    a main antenna element which is a conductive strip and comprises a first part, which extends substantially perependicular to upper and lower edges of the window glass in a widthwise central region of the window glass and has an end at a short distance from the upper edge of the glass, and a second part comprising a horizontal segment which extends from said end of said first part substantially parallel to said upper edge and has an end in said side marginal region of the glass, and a supplementary segment which extends in said side marginal region of the glass from said end of said horizontal segment to said feed point; and
    an impedance matching antenna element which is a conductive strip straight and parallel to said supplementary segment of said second part of said main antenna element and is connected to said supplementary segment of said second part of said main antenna element within said lower end part of said side marginal region of the glass.

2. An antenna according to claim 1, wherein said impedance matching antenna element extends parallel to said supplementary segment of said second part of said main antenna element.

3. An antenna according to claim 1, wherein the length and arrangement of said impedance matching antenna element are such that a resistance component of the impedance of the antenna becomes not smaller than 75 ohms.

4. An antenna attached to an automobile windshield glass for receiving broadcast waves, the antenna comprising:
    a feed point disposed in a lower end part of a side marginal region of the window glass;
    a main antenna element which is a conductive strip and comprises a first part, which extends substantially perpendicular to upper and lower edges of the window glass in a widthwise central region of the window glass and has an end at a short distance from the lower edge of the glass, and a second part which extends from said end of said first part to said feed point substantially horizontally at a short distance from said lower edge; and
    an impedance matching antenna element which is a conductive strip straight and parallel to said second part of said main antenna element and is connected to said second part of said main antenna element within said lower end part of said side marginal region of the glass.

5. An antenna according to claim 1, wherein the length and arrangement of said impedance matching antenna element are such that a resistance component of the impedance of the antenna becomes not smaller than 75 ohms.

6. An antenna according to claim 1, wherein said impedance matching antenna element extends parallel to said second part of said main antenna element.

* * * * *